July 9, 1940. V. VIKTORA 2,207,494
PROCESS AND APPARATUS FOR THE HYDROGENATION OF CARBONACEOUS MATERIALS
Filed Feb. 8, 1937
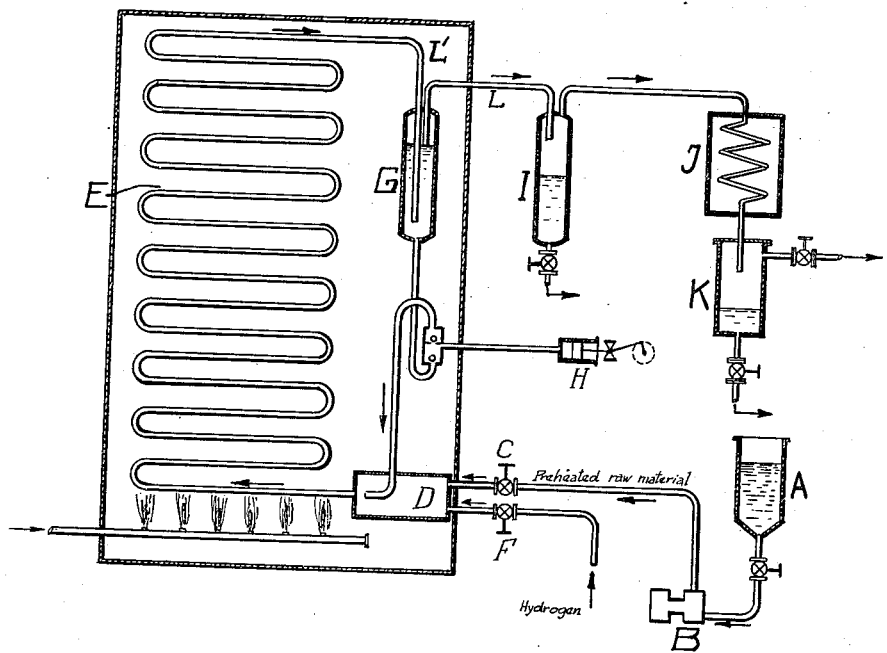
INVENTOR,
Václav Viktora
BY Frank S. Appleman
ATTORNEYS.

Patented July 9, 1940

2,207,494

UNITED STATES PATENT OFFICE 2,207,494

PROCESS AND APPARATUS FOR THE HYDROGENATION OF CARBONACEOUS MATERIALS

Václav Viktora, Moravska Ostrava, Czechoslovakia, assignor to the firm Československé tovarny na dusikaté latky akc. spol./Czechoslovakian Nitrogen Works Co., Ltd., Moravska Ostrava, Czechoslovakia Application February 8, 1937, Serial No. 124,787
In Czechoslovakia February 8, 1936

8 Claims. (Cl. 196—62)

In the majority of the known processes of hydrogenating coal and carbonaceous raw materials, the starting material is led, either separately or together with hydrogen, through a heat exchange device and preheater into the reaction chambers, several of which may be arranged one behind another. Here the hydrogenating gas is caused to flow through the raw materials (which may be mixed with catalysers) or the latter are led with the hydrogen over a stationary catalyser or over surfaces having a catalytic activity.

The most important desideratum in any hydrogenating process is an intimate contact between the hydrogen and the raw materials and as wide a distribution of heat as possible. The latter condition is also important owing to the fact that the hydrogenation and decomposition temperatures are comparatively close to one another, so that a slight superheating is sufficient to cause a deposition of carbon or soot and thus to choke up the apparatus. This is the biggest drawback and that most frequently met with in the practical operation of the known hydrogenation processes. It is also obvious that in deciding the merits of the various hydrogenation processes the initial outlay is an important consideration.

It is an object of the present invention to provide a hydrogenation process which corresponds to the requirements mentioned above and which is free from disadvantages attaching to the earlier processes.

According to the present invention, therefore, I provide a method of hydrogenating coal or other carbonaceous material wherein predetermined and comparatively tiny portions of fresh raw material are added in a continuous or discontinuous manner to a circulating medium, maintained under the conditions favourable to the required reaction. It is essential that the amounts of the added new raw material be so controlled that the homogeneity of the circulating medium, that is to say the physical and chemical characteristics thereof which the reaction conditions call for, is not substantially altered.

The reaction medium consists of the actual hydrogenation products, and these represent an excellent solvent and distributing means both for the hydrogenating gas and the fresh raw material, whereby the particles of the latter are subjected very thoroughly to the action of the hydrogenating gas and catalysts.

Moreover the reaction medium has the useful property of not tending to coke like the raw material, so that if necessary it is also able, on account of its greater stability, to protect the raw material distributed therein. A high rate of circulation is also favorable in this connection, since it causes an intimate mixing of the reacting materials and a complete distribution of heat, thus reducing the risk of any local over-heating and consequent deposition of soot to a minimum.

The following is an example of an embodiment of the process according to the invention and is intended to be read in conjunction with the annexed drawing. It is to be understood however that this example and the accompanying drawing are in no way limitative of the invention.

Example

Fresh raw material is led from a container A to a press B, from whence it is conducted in continuous or discontinuous manner through a check valve C to a pressure regulator D, which is simultaneously supplied with hydrogen through a valve F.

From the regulator D the materials pass into a reaction chamber E which comprises a thick-walled, tubular worm or serpentine which is of comparatively small cross-section and which is heated from the exterior. The reaction medium, which consists of products of hydrogenation, circulates over a corresponding course through said reaction chamber.

The partly-treated raw material then leaves the reaction chamber and passes to a supply container G by the pipe L' without a preliminary separation of the constituents, which is held on the same reaction conditions as the reaction chamber, whence it is returned to the reaction chamber by means of a pump H, thus completing the closed circuit.

The reaction products are withdrawn from the supply container G at the same rate as that at which the raw material is introduced into circulation, irrespective of whether this introduction takes place continuously or discontinuously, and are forwarded to a heated separator I wherein the gaseous portion is separated fom the liquid content. The line L ends within the container G between the gaseous and liquid phase so that the reaction products including gases and vapors which are withdrawn have the same composition as the circulating reaction medium. The products are withdrawn from G to the separator I, for instance, by means of a pump (not shown) or by means of a lower pressure existing in the separator I or the like. The gaseous part then passes through a cooler J into a further separator K, from the lower part of which liquid hydrogenation products are withdrawn for further treatment.

The uncondensed gases and any unused hydrogen are taken off at the upper end of the separator K, and the hydrogen may, if desired, be returned to the circulating stream.

The following are examples of the manner in which this invention is carried out:

A. When crude anthracene is mixed in the proportions of 1:1 with the fluid portion of the preceding phase of the operation and is introduced into the closed reaction cycle, wherein hydrogenation products are circulated at a temperature of 470° C. and pressure of 200 atmospheres and at such a rate that the quantity thereof passing through a cross-section of the reaction pipe in unit time is 45 times greater than the amount of raw material introduced in the same space of time, the product which is withdrawn continuously from the reaction mixture is found to contain a proportion of about 60% of materials having a boiling point of less than 300° C.

B. When molten crude naphthalene or crude naphthalene dissolved in tetraline is introduced into the closed circuit of the reaction materials wherein the products of hydrogenation are circulated, 90 times as much hydrogenation material passes through a cross-section of the reaction apparatus as fresh naphthalene is introduced in the same unit time. By suitably selecting the reaction conditions, the circulating materials may be brought into a state of equilibrium. There is then obtained, for instance, at a pressure of 250 atmospheres and a temperature of 460° C. a product containing 80% tetraline, 8% decaline and the remainder of single-ring aromatic hydrocarbons. The crude product is continuously extracted and fractionated.

C. When technical tri-cresol and hydrogen are introduced into the closed hydrogenation circuit in the ratio of 1:45 to the amount of hydrogenation products passing in unit time, by operating at a pressure of 150 atmospheres and a temperature of 470° C., a product is secured which contains 73.6% hydrocarbons composed of 5% benzol, 83% toluol, 5% higher aromatics and 7% hydroaromatic hydrocarbons. The remainder of the product is unhydrogenated cresol which, after separation of the hydrocarbons referred to above, is reprocessed together with fresh cresol.

D. Mineral oil having a specific weight of 0.940 and of such composition that 3% distills off up to 250° C. and 40% between 250° and 320° C. and the remainder above 320° C. is added continuously at a rate of 4 kg. per hour to the circulating hydrogenation mixture containing the oil obtained by hydrogenation. The amount of oil, that is, hydrogenation product of the mineral oil, passing through a cross-section of the circuit in an hour is 120 kg. A pressure of 200 atmospheres and a temperature of 470° C. is maintained throughout the closed circuit. Products of hydrogenation are withdrawn continually from the storage container present in the circuit by means of a suitable overflow device, and unused hydrogen is separated from these products by cooling and may be returned to the circulating medium. Under the conditions described above, 60% by weight of the oil is transformed into crude petrol or benzine (fraction up to 200° C.) and 12% by weight is transformed into petroleum (200–300° C. fraction). The remainder consists partly of the distillation fraction of boiling point above 300° C. and partly of hydrocarbon gases. The ratio existing between the quantity of raw material introduced in unit time and the amount of hydrogenation products passing a section of the circuit also in unit time can be varied in accordance with the rate at which the hydrogenation reaction proceeds. The higher this rate, that is to say the quicker equilibrium is established, the greater may be the amount of raw material supplied to the circulating medium in unit time.

E. A coal paste, made up of 68.5% oil, 30% brown coal or lignite and 1.5% of a catalyst (which may be of any usual type, such as compounds of heavy metals, for instance, copper, zinc, cadmium, molybdenum, chromium, mainly oxides, sulfides, etc.) is added at a rate of 3.5 kg. per hour to the closed circuit through which hydrogenation products are flowing at a rate of 120 kg. per hour. A pressure of 200 atmospheres and a temperature of 400° C. are maintained in the circuit. A portion of the circulating materials is continually withdrawn by a suitable overflow device from a storage container in the circuit, this portion being moreover removed at the same rate that fresh raw material is brought into circulation. In this initial phase and under the conditions set forth, there is obtained by the hydrogenation of the lignite, i. e., fresh lignite, 20.2% of a light oil fraction having a boiling point of less than 300° C., 54% of a heavy oil fraction having a boiling point over 300° C., 3.8% unhydrogenated carbonaceous matter, 7.4% ash, 14.2% moisture or water of reaction and the remainder, 0.4% gases. The light oil fraction contains 70% of hydrocarbon, 28% of acid oil (phenols) and 2% of pyridine bases.

In this process the reaction conditions can easily be kept constant and controlled, so that if the reaction conditions remain the same, the hydrogenation product always has the same composition. It is possible, by suitably varying the reaction conditions, to obtain a desired and constant composition of the reaction products, provided this can be achieved by hydrogenation, that is to say, it is possible to secure the predetermined and desired ratio between the light and heavy oil fractions or the desired unvarying composition of the light oil.

The liquid separated in separator I is withdrawn from the bottom of the latter and may be also returned to circulation.

The advantages of the process described are apparent. Owing to the rapid movement of the circulating materials, the latter are thoroughly mixed with the hydrogenating gas and are fully subjected to the action of the catalyst which is optionally employed. Moreover a most effective and thorough distribution of heat is secured, and as a result the formation of soot is very limited. The fact that the fresh raw material, which generally tends to coke, is added to the circulating and partly-treated raw material in comparatively small portions at a time also contributes to a reduction in soot formation.

By using apparatus of the kind indicated above, the further advantage is secured that, owing to the fact that the actual reaction chamber consists of a thick-walled tube, high and super- or hyper-pressures can be employed in carrying out the process, for example pressures of over 1000 atmospheres might be used, with the result that the rate of reaction can be increased, and the use of catalysts even dispensed with in some cases.

To these advantages must be added the high output as compared with the smallness of the reaction chamber and thus small initial outlay.

I claim:

1. The process of treating carbonaceous material which consists in introducing a mixture of the carbonaceous material in a raw state and hydrogen into a circulating system and subjecting the same to heat to form a circulating medium consisting of all hydrogenation products formed within the said circulating system including gaseous and vaporous portions, causing said circulating medium to reflow continuously through said system in an unseparated condition while maintaining the uniform chemical and physical conditions primarily established in said circulating system and while drawing off a portion of the unseparated hydrogenated products at one point in the system, and introducing corresponding quantities of the raw material and hydrogen into the system.

2. That process of treating a carbonaceous material which consists in introducing a mixture of the carbonaceous material in a raw state and hydrogen into a circulating system and subjecting the same to heat to form a circulating medium consisting of all hydrogenation products formed within the said circulating system including gaseous and vaporous portions, causing said circulating medium to reflow continuously through said system in an unseparated condition while maintaining the uniform chemical and physical conditions primarily established in said circulating system and while drawing off a portion of the unseparated hydrogenated products at one point in the system, and introducing corresponding quantities of the raw material and hydrogen into the system, said raw material being preheated prior to its introduction into said system.

3. In apparatus for the hydrogenation of carbonaceous materials, a container for raw carbonaceous material, a pressure regulating chamber having pipe connection with said container, said pipe connection having therein a check valve opening toward said chamber, a valved hydrogen supply pipe communicating with said chamber, a reaction coil having one end leading from said chamber, means to heat said coil, a treated supply vessel into which the other end of said coil opens, a pipe connection between said supply vessel and said chamber and having pump means constructed and arranged to draw material from said vessel and force it into said chamber, and an overflow pipe permitting escape of part of the material from said vessel upon introduction of a further supply of raw material and hydrogen into said chamber.

4. In apparatus for the hydrogenation of carbonaceous materials, a container for raw carbonaceous material, a pressure regulating chamber having pipe connection with said container, said pipe connection having therein a check valve opening toward said chamber, a valved hydrogen supply pipe communicating with said chamber, a reaction coil having one end leading from said chamber, means to heat said coil, a treated supply vessel into which the other end of said coil opens, a pipe connection between said supply vessel and said chamber and having pump means constructed and arranged to draw material from said vessel and force it into said chamber, an overflow pipe permitting escape of part of the material as a circulating medium from said vessel upon introduction of a further supply of raw material and hydrogen into said chamber, a separator into which said overflow pipe opens, pipe means for the lighter separated portions of the material in the separator, said last mentioned pipe means leading from the upper part of the separator, draw off means at the bottom of the separator, a condenser with which the last mentioned pipe means communicates, a second separator into which said condenser opens, and separate draw off means leading from the second separator for the lighter and heavier materials into which the material received in said second separator is separated.

5. In apparatus for the hydrogenation of carbonaceous materials, such as hydrocarbons, hydrocarbon oils, coal paste, for instance, a circulation system consisting substantially of a tubular reaction vessel, connections between the ends of the tubular vessel, means for maintaining in movement a reaction medium within the said circuit, this reaction medium consisting of all hydrogenation products formed within the circuit including gases and vapors, means for holding the said reaction medium in all parts of the circuit substantially under the same conditions in respect of temperature, pressure, chemical composition and homogeneity, means for adding hydrogenation gas into the circuit, and means for withdrawing without preliminary separation a part of the circulating reaction medium from the circuit including gaseous vapor and liquid phase.

6. In apparatus for the hydrogenation of carbonaceous material under any temperature and pressure conditions, a circulation system consisting substantially of a tubular reaction vessel, a supply vessel of a greater diameter than the tubular vessel, connections between the tubular reaction vessel and the supply vessel and between this supply vessel and the other end of the said reaction vessel, means for maintaining in movement a reaction medium within the said circuit, this reaction medium consisting of all hydrogenation products formed within the circuit including gaseous and vapor phase, means for holding the said reaction medium in all parts of the circuit under the same conditions in respect of temperature, pressure, chemical composition and homogeneity, means for adding fresh material to be hydrogenated into the circuit, means for adding hydrogenated gas into the circuit, and means for withdrawing without preliminary separation a part of the circulating reaction medium from the said supply vessel including gaseous, vapor and liquid phase.

7. In apparatus for the hydrogenation of carbonaceous material, a circulation system consisting substantially of a tubular reaction vessel, a supply vessel of a greater diameter than the reaction vessel, connections between the tubular vessel and the supply vessel and between this supply vessel and the other end of the said reaction vessel, means for maintaining in movement a reaction medium within the said circuit, this reaction medium consisting of all hydrogenation products formed within the circuit including gaseous and vapor phase, means for holding the said reaction medium in all parts of the circuit under the same conditions in respect of temperature, pressure, chemical composition and homogeneity, means for adding fresh materials and the hydrogenating gas into the reaction medium, and means for withdrawing without preliminary separation a part of the circulating reaction medium from the said supply vessel at the same rate at which the fresh material and hydrogenating gas are introduced into the circulating medium.

8. In apparatus for the hydrogenation of carbonaceous materials, a circulation system consisting substantially of a tubular reaction vessel, a supply vessel of a greater diameter than the reaction vessel, connections between the both vessels, means for maintaining in movement a reaction medium within the said circuit, this reaction medium consisting of all hydrogenation products formed within the circuit including gaseous and vapor phase, means for holding the said reaction medium in all parts of the circuit under the same conditions in respect of temperature, pressure, chemical composition and homogeneity, means for adding fresh materials and the hydrogenation gas into the reaction medium, a tube for removing a part of the circulating reaction medium from the said supply vessel without preliminary separation of the constituents, and a separator provided outside the circulating system for separating the part of the reaction medium removed from the system into the normally gaseous and liquid portions.

VÁCLAV VIKTORA.